United States Patent [19]

Porter et al.

[11] 4,118,627

[45] Oct. 3, 1978

[54] GUIDANCE SYSTEM FOR LASER TARGETS

[75] Inventors: Gary D. Porter, Livermore; Anatoly Bogdanoff, Danville, both of Calif.

[73] Assignee: The United States of America as represented by the United States Department of Energy, Washington, D.C.

[21] Appl. No.: 698,553

[22] Filed: Jun. 22, 1976

[51] Int. Cl.$^2$ ............................................. G01K 1/08
[52] U.S. Cl. ..................................... 250/397; 176/1; 250/491
[58] Field of Search .................. 250/492 A, 396–400; 176/1; 346/159

[56] References Cited

U.S. PATENT DOCUMENTS 3,582,958  6/1971  Hendricks, Jr. ...................... 346/159
3,857,090  12/1974  Chick ................................ 250/492 A

OTHER PUBLICATIONS

MATT-1050, 8/74, pp. 526–529.
Technology Review, 12/76, pp. 20–24, 32–34, 41–43.
ERDA-28, 1/75, pp. 1–3, 8–10.
Nuclear News, 2/77, p. 68.

Primary Examiner—Harvey E. Behrend
Attorney, Agent, or Firm—Dean E. Carlson; Roger S. Gaither; L. E. Carnahan

[57] ABSTRACT

A system for guiding charged laser targets to a predetermined focal spot of a laser along generally arbitrary, and especially horizontal, directions which comprises a series of electrostatic sensors which provide inputs to a computer for real time calculation of position, velocity, and direction of the target along an initial injection trajectory, and a set of electrostatic deflection means, energized according to a calculated output of said computer, to change the target trajectory to intercept the focal spot of the laser which is triggered so as to illuminate the target of the focal spot.

4 Claims, 1 Drawing Figure

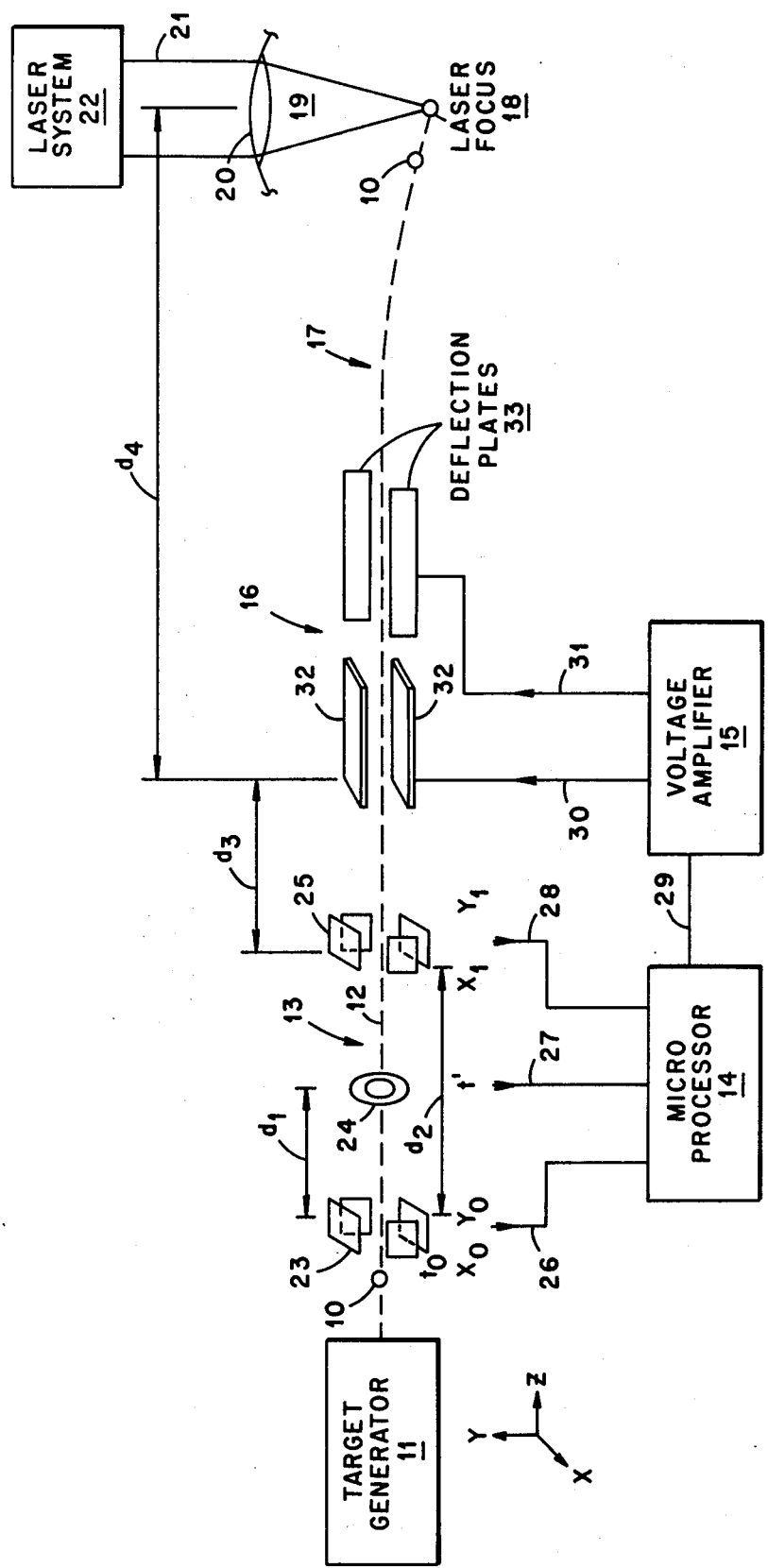

GUIDANCE SYSTEM FOR LASER TARGETS

BACKGROUND OF THE INVENTION

The invention described herein was made in the course of, or under, Contract No. W-7405-Eng-48, with the United States Energy Research and Development Administration.

The invention relates to guidance systems, particularly to guidance systems for laser targets, and more particularly to a guidance system for charged lser targets for directing such targets to a focal spot within a controlled thermonuclear reactor for illumination by a laser.

Guidance systems for ion beams, droplets, and pellets, etc., are known in the art as evidenced by U.S. Pat. No. 3,582,958 issued June 1, 1971 in the name of C. D. Hendricks, Jr., and U.S. Pat. No. 3,723,246 issued Mar. 27, 1973 in the name of M. J. Lubin; an article entitled "Collision, Coalescence, and Distruption of Water Droplets" by J. R. Adam et al., Journal of Applied Physics, Vol. 39, No. 11,5173-5180, October 1968; and an article entitled "Laser-Induced Thermonuclear Fusion" by J. Nuckolls et al, Physics Today, August, 1973. The above referenced prior known guidance systems are of the electrostatic type which utilize electrodes functioning as deflection plates to direct the flight path of the material concerned. In controlled thermonuclear reactor (CTR) system, there is a particular requirement for an effective, accurate target guidance system to insure that each of the targets, which for example may be injected at the rate of 100 per sec., is directed through the focal spot of the laser beam. Therefore, there is a need in the CTR field for a guidance system which can reproducibly deliver targets or pellets to the laser focal spot at predetermined instants of time.

SUMMARY OF THE INVENTION

The present invention is a guidance system for reproducibly delivering laser targets injected into a CTR to a focal spot of the laser beam. The guidance system is particularly adapted for guiding such targets along a horizontal injection trajectory, but may also be utilized in vertical or tangential target injection modes. Broadly, the guidance system comprises a first series of electrostatic sensors which provide inputs to a computer for real time calculation of position, velocity, and direction of the target along an initial injection trajectory, and a set of electrostatic deflection means energized according to a calculated output of the computer to change the target trajectory to intercept the focal spot.

Therefore, it is an object of this invention to provide a guidance system for laser targets.

A further object of the invention is to provide a system for guiding charged laser target along a trajectory to intercept the focal spot of a laser.

Another object of the invention is to provide a guidance system for laser targets wherein a computer provides real time position, velocity and direction information of the target injection trajectory for controlling target deflection means to assure reproducible delivery of the target to the laser focal spot.

Another object of the invention is to provide a guidance system for charged laser targets injected along a horizontal direction for reproducibly directing the trajectory of such targets to intercept the focal spot of a laser.

Another object of the invention is to provide a guidance system for controlling the trajectory of laser targets injected into a CTR so that such targets intercept the focal spot of a laser for illuminating the targets.

Another object of the invention is to provide a guidance system for charged laser targets injected into a CTR wherein electrostatic sensors provides inputs to a computer for real time calculation of position, velocity, and direction of the target along an initial injection trajectory, and electrostatic deflection means energized according to the calculated output of the computer controls the target trajectory so as to intercept the focal spot of a target illuminating laser.

Other objects of the invention will become readily apparent to those skilled in the art from the following description and accompanying drawings.

BRIEF DESCRIPTION OF THE DRAWINGS

The single FIGURE schematically illustrates an embodiment of a laser target guidance system made in accordance with the invention.

DESCRIPTION OF THE INVENTION

The invention is directed to a guidance system for laser targets or pellets injected into a Cont. Ther. Reac. (CTR) to control the trajectory of the targets such that they pass through the focal spot of a laser system triggered to illuminate, vaporize, ionize, or implode the target by laser energy.

While the invention is applicable to vertical, tangential, and horizontal target injection techniques in magnetic confinement and laser fusion CTR systems, the invention is described hereinafter for guiding the trajectory of charged laser targets along a horizontal direction in a magnetic confinement CTR, such as that known as the Baseball II facility, but it is not intended to limit the invention to any specific type of system.

The laser targets may constitute pellets produced using the fluid jet process described in an article by J. M. Schneider, et al., Rev. Sci. Inst. 35, 1349, 1964 or they may be composed of charged frozen ammonia pellets, for example, wherein the charged pellets are directed through a small, shaped orifice to a high vacuum (about $10^{-5}$ torr) region where they freeze by evacuation such pellets or targets being produced in a target generating system described and claimed in copending U.S. patent application Ser. No. 698,557 filed June 22, 1976 in the name of R. K. Goodman et al. The thus generated targets are guided from the target generating system along a generally horizontal trajectory into the magnet confinement region of a CTR by the guidance system to control the target trajectory to insure reproducible delivery of the targets to the focal point or spot of a laser system. As shown in the drawing, a charged target 10, composed for example of ammonia impregnated with an elctrically conductive material such as HCL, is ejected from a target generating machanism indicated at 11 along an initial horizontal trajectory 12 which passes through the guidance system composed generally of a sensor section 13, a micro processor or computer 14, a voltage amplifier 15, and a deflection section 16, along a final trajectory 17 to a focal point or spot 18 within a magnetic confinement region or target zone 19 or a lens 20 to be illuminated by a laser beam 21 passing through the containment wall of the CTR from a laser system 22, where in this embodiment the target 10 is vaporized and ionized by the laser energy of beam 21 to generate a target plasma which is used for trapping a beam of energetic neutral particles. Inasmuch as the details of the target generator 11 and the CTR and laser system 22 do not constitute part of this invention, and since exemplary embodiment thereof are known in the art as illustrated by the above cited prior art, detail description thereof is deemed unnecessary.

The components generally indicated at 13–16 constitute an embodiment of the target guidance system of this invention. Sensor section 13 comprises a first set of electrostatic sensing plates 23, an annular sensor 24, and a second set of electrostatic plates 25, each generating output signals 26, 27 and 28, respectively, which are directed into micro processor 14. The first set of sensing plates 23 (four plates) sense a time of arrival $t_o$ and initial $x$ and $y$ coordinates ($x_o$-$y_o$) of the trajectory 12 of target 10. The annular sensor 24 positioned at a distance $d_1$ from plates 23 establishes the time $t'$, at which the target 10 passes, permitting calculation of the target velocity. The second set of sensing plates 25 furnish a second measurement of $x$ and $y$ coordinates ($x_1$-$y_1$) at a known distance $d_2$ from the first point of coordinate measurement (plates 23) which defines the spacial parameters of the trajectory 12. Taking a measurement of a time, $t'$, prior to the second coordinate measurement from sensing plates 25 enables more effective use of computer time, which is critical in view of the limited target transit time. The time, $t'$, is taken by the annular detector 24. For example, distance $d_1$ is 8cm and distance $d_2$ is 40cm, and a typical time frame from $t_o$ to $t'$ is 2.67 msec, with the target velocity being about 30 meters/sec. The signals 26, 27 and 28 provide inputs to the micro processor or computer 14 for real time calculation of position, velocity, and direction of the target 10 along its initial injection trajectory 12, which enables the micro processor 14 to then calculate and issue via voltage amplifier 15 the necessary signals to appropriately power the deflection section 16 to bring the target on final trajectory 17 leading to the laser focal point 18.

The details of the micro processor or computer 14 do not constitute part of this invention but generally is composed of a signal processing section which digitizes the incoming signals 26, 27, and 28, a memory section in which the digitized signals are stored and an INTEL model 8080 chip which forms the heart of the computer section.

Voltage amplifier 15 may be of a conventional type capable of receiving input signals 29 from micro processor 14 in the range of 0 to 10 and amplifying such signal to the 0 to −5Kv range and dividing the output thereof into signals 30 and 31 which are directed to deflection section 16.

Deflection section 16 comprises two pairs of deflection plates 32 and 33, pair 33 being positioned at 90° with respect to pair 32 and connected to received output signal 30 and 31, respectively, from voltage amplifier 15. The pairs of deflection plates 32 and 33 are positioned at a sufficient distance $d_3$ from sensing plates 25 to allow sufficient time for the micro processor 14 to process the sensing signal 26–28 and calculate course correction signals which are amplified at 15 and impressed upon deflection plates 32 and 33 to appropriately establish the final trajectory 17 of target 10. For example, the distance $d_3$ is 44 cm with a time of about 15 msec, while the distance $d_4$ from the deflector plates to the focal point 18 is about 1.2 meters with a time of about 40 msec.

Tests conducted on the above described guidance system using charged ammonia targets or pellets have shown that the system provides effective means for accurately guiding charged laser targets to a predetermined focal point or spot along generally arbitrary, and especially horizontal, directions, thereby providing a practical guidance system for charged targets, thus substantially advancing the state of the art in this field.

As pointed out above, while the guidance system has been described and illustrated for horizontal injection applications in a magnetic confinement CTR field, it can be effectively utilized in the laser fusion CTR field, as well as having applications to the vertical and tangential target injection techniques.

While a particular embodiment, parameters, etc., have been illustrated and/or described, modifications and changes will become apparent to those skilled in the art, and it is intended to cover in the appended claims all such modifications and changes that come within the scope and spirit of the invention.

What we claim is:

1. A guidance system for targets comprising; electrostatic sensing means for generating signals responsive to $x$ and $y$ coordinates and time of travel of an associated target over a predetermined distance along an initial trajectory, micro processing means for receiving said signals from said sensing means for real time calculation of position, velocity, and direction of such an associated target and for producing calculated course correction output signals, electrostatic deflecting means positioned in alignment with said sensing means and responsive to said calculated course correction output signals from said micro processing means for correcting the trajectory of such an associated target, and amplifier means operatively connected between said micro processing means and said deflecting means for amplifying said calculated course correction output signals.

2. The guidance system defined in claim 1, wherein said sensing means comprises a first set of plates which sense a time of arrival and initial $x$ and $y$ coordinates of an associated target along the initial trajectory, an annular sensor aligned with and spaced from said set of plates which establishes the time at which such an associated target passes thereby, and a second set of plates aligned with and spaced from said annular sensor which sense $x$ and $y$ coordinates at a predetermined distance from said first set of plates.

3. The guidance system defined in claim 1, wherein said deflecting means comprises at least two pairs of spaced deflection plates, one pair of plates being oriented about 90° with respect to the other pair of plates, said pairs of deflection plates being aligned with and spaced from said sensing means to allow sufficient time for said micro processing means to process said signals from said sensing means and calculate said course correction signals, each of said pairs of deflection plates being operatively connected to said amplifier means for receiving output signals therefrom.

4. The guidance system defined in claim 2, wherein said deflecting means comprises two pair of spaced deflection plates with one pair positioned about 90° with respect to the other pair, said pairs of deflection plates being aligned with and spaced from said second set of plates of said sensing means, each pair of said deflection plates being operatively connected to said amplifier means for receiving said calculated course correction output signals.

* * * * *